United States Patent [19]

Pannizzo

[11] Patent Number: 5,135,413

[45] Date of Patent: Aug. 4, 1992

[54] WINDOW OUTLET

[76] Inventor: Peter P. Pannizzo, 15 Mt. Tom Rd., New Milford, Conn. 06776

[21] Appl. No.: 747,938

[22] Filed: Aug. 21, 1991

[51] Int. Cl.⁵ .............................................. H01R 13/60
[52] U.S. Cl. ........................................ 439/577; 49/55;
52/221; 174/48; 248/208
[58] Field of Search ............... 439/577; 49/55, 61;
52/221; 248/208, 236; 220/3.3, 3.5, 3.6; 174/48

[56] References Cited

U.S. PATENT DOCUMENTS 4,982,536  1/1991  Muhlethaler ................. 174/48 X
5,056,262  10/1991  Schweiss et al. ............... 49/55 X Primary Examiner—Eugene F. Desmond
Attorney, Agent, or Firm—Murray J. Kessler

[57] ABSTRACT

A device designed to fit in a window that provides electrical power and signal connections for appliances used outdoors.

6 Claims, 1 Drawing Sheet

SECTION 2:2

WINDOW OUTLET

SUMMARY OF THE INVENTION

In todays age of technology and outdoor recreation an ever expanding number of outdoor appliances and tools have been converted to electric power. Lawn mowers, hedge clippers, and snow blowers now very often "plug in" to an electric outlet. Televisions, radios and other appliances usually used indoors come outside during period of pleasant weather.

The homeowner or even an apartment dweller often needs electrical power outside where no convenient connection exists. The solution in the past was to throw an extention cord out the window nearest the area of use. The drawbacks of this solution include leaving the windows slightly ajar, which admits unwanted pesty insects and causes the loss of heat in winter and air conditioning in the summer. Closing the window damages the extention cord and creates a shock hazard.

This invention solves those problems by providing electrical outlets and places for signal jacks on a panel that fits in the window. The panel adjusts to any window size and has resilient seals along the edge so that the window may be closed maintaining the integrity of the heated or cooled interior. A heavy duty power cord with three prong grounding plug connects to an interior house power wall outlet allowing the user to plug outside power cords into the panel outlets. Mounting holes or knock outs are provided to allow jacks to be inserted in the panel to permit connectons of electronic cables such as for TV, telephone and stereo. Plastic plugs are provided to close those holes not used. The outlets, power cord and jacks are located nearer one end of the panel so the assembly may be installed with either long edge up to allow the power cord and connections to be to the left or right side of a winder opening to take advantaage of the nearest interior power outlet. The invention is configured so that it may be installed vertically in a casement style window. A removable flat bracket mounts on the rear edge and projects beyond the edge of the panel to catch against the closed edge of the window to prevent the panel from being pulled out of the window opening. Clamping for the outside cables provides strain relief to keep those cables from being pulled out of their connections.

DETAILED DESCRIPTION

Figure 1:
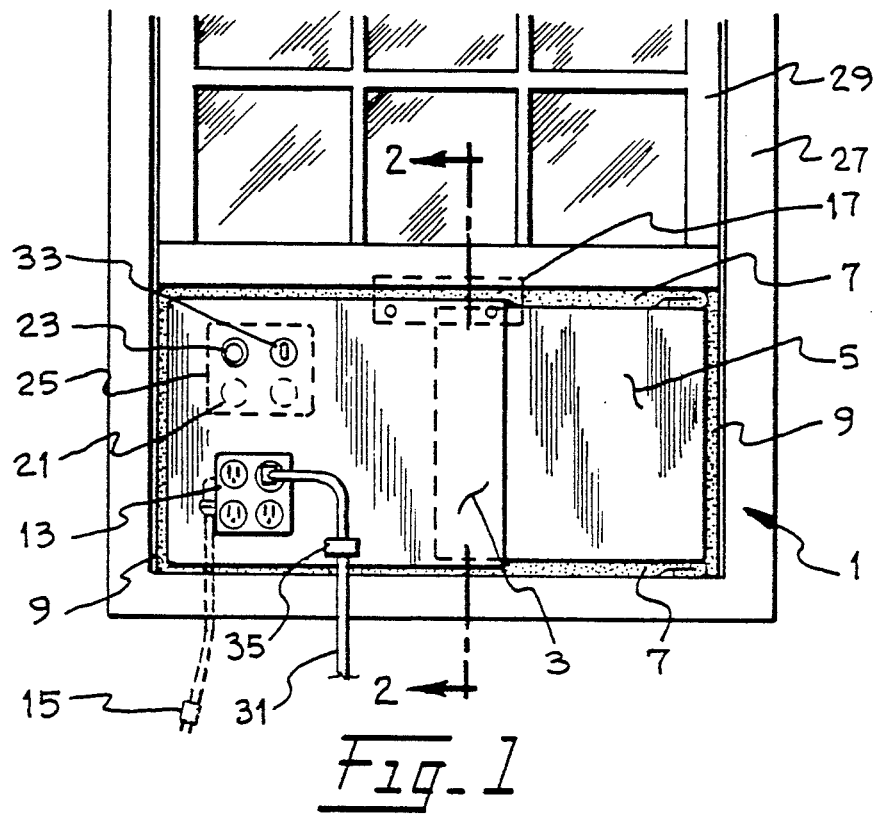
FIG. 1. Depicts the external view of the panel mounted in a standard window with an expanded detail of one corner shown to illustrate how the end of the weather strip may fold over.

Referring to FIG. 1, the panel assembly (1) consists of a hollow enclosure (3) oblong in shape closed at one shorter end and open at the other from which extends an oblong inner panel (5) dimensioned to maintain a snug slide fit within the hollow of the outer encloses (3). Both the enclosure (3) and the inner panel are made of suitable material such as plastic, wood or sheet metal to provide rigidity in application and to mount the various components. Affixed along the closed edges of the enclosure by suitable means such as adhesive are continuous weather strips (7) of a resilient and compressible material such as rubber or plastic foam which strips (7) extends for some length beyond the open end of the enclosure (3). Affixed along the shorter edge of the inner panel (5) which protrudes from the enclosure (3) by similar means is a continuous weather strip (9) of the same material as the longer strips (7).

Figure 2:
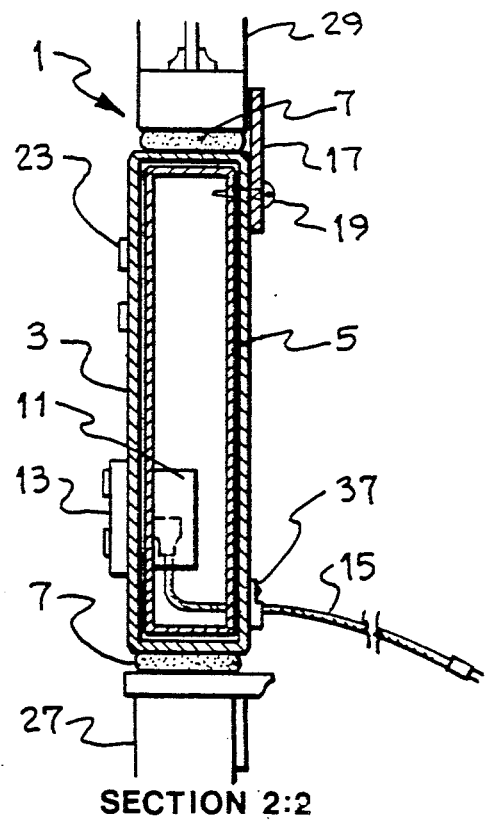
FIG. 2. Depicts a vertical cross-section (A—A) of the panel.

Referring to FIG. 2, mounted by suitable means through the front surface of the enclosure towards the closed end, is a commercially available standard electrical box (11) containing one or more standard duplex electrical outlets with covers (13) which are wired to a commercially available heavy duty standard power cord and grounded three prong plug (15) which is secured to by mechanical means (37), such as a clamp and protrudes from the back of the enclosure (3) in the area of the outlets (13). A flat oblong bracket (17) which extends beyond one edge is mounted to the rear surface along the top of the enclosure (3) by a suitable mounting means (19) such as sheet metal or self-tapping screws of sufficient length that when tightened in place, they penetrate the rear surface of the inner panel (5) holding it in place against the enclosure. Referring to FIG. 1, on the front surface of the enclosure (3) in the area of the outlets (13) are a number of prepunched knockout holes (21) of various sizes for the installation of electronic jacks or recepticle such as telephone modular recepticle (33) and coaxial cable TV jack (not shown). The preferred embodiment of this feature are prepunched knockout holes. A suitable alternative is prepunched holes (21) with plastic plugs (23) provided to close unused holes (21). An opening (25) in the rear surface of the enclosure (3) just behind the knockout holes (21) provides access to the knockout holes (21).

In application the user places the "Window Outlet" assembly (1) in the bottom of an open window frame (27). The proximity of an interior power outlet (not shown) determines if the closed end of the enclosure(3) is to the left or right. The inner panel (3) is extended so both weather strips (7) and (9) press against the side of the window frame (27). The lower and upper weather strips (7) are folded at the ends so the fold rests against the window frame (27) and on top of the side weather strip (9). The bracket (17) is mounted on the upper rear surface of the enclosure and the mounting screws (19) are tightened, which fixes the inner panel (5) in place. The movable part of the window (29) is closed against the assembly (1) pressing against the upper weather strip (7). The pressure of the closed window (29) compresses the folded ends of the weather strip (7) and seals the installation. The protrusion of the bracket (17) behind the edge of the closed window (29) keeps the assembly (1) from being pulled out of the frame (27). The power cord and plug (15) is inserted in the interior power outlet (not shown).

The user may then connect his appliance power cords (31) to the electrical outlets(13) in the assembly (1). The available panel knockouts (21) may be punched out to install through panel connectors such as a modular telephone plug (33) or connectors for a video tape recorder (not shown) to correct video and audio cables (not shown). The assembly (1) will work in a vertical orientation in a sliding casement window (not shown). A clamping means (35) such as a commercially available cable clamp or spring clamp is used to provide strain relief for any exterior cables (not shown) and the appliance power cords (31).

I claim:

1. An assembly consisting of a hollow oblong enclosure, with one shorter end open, of suitable dimension and material to be installed in a window frame to support the weight of a closed window and to have its longer edge shorter than the width of the narrowest standard windows, and to have mounted by mechanical means in said enclosure, near the closed end, one or more standard duplex electrical outlet boxes with standard duplex outlets and covers installed in said boxes on the front surface of said enclosure and wired to a conventional heavy duty power cord with grounding plug which power cord and plug extends through and is secured to the rear surface near the closed end of said enclosure, said enclosure having emanating from its open end an inner panel of oblong shape dimensioned to provide a snug slide fit to the interior dimensions of said hollow enclosure and of sufficient length so that said inner panel may slide partially out of said enclosure to extend the width of said assembly to the width of the various conventional window openings and the height of sliding casement window openings.

2. The assembly referred to in (1) above wherein affixed by suitable means along the closed shorter end and longer edges of said enclosure and the shorter edge of said inner panel emanating from said enclosure are continuous resilient compressible weather stripping such as urethane foam strips said stripping extending along the longer edges of said enclosure beyond the open end of said enclosure to such lengths as to rest completely along the longer edges of said inner panel at its fullest extension oriented on said edges so that when said assembly is placed in a window frame with the inner panel extended and the window is closed against said assembly, said weather strips will compress against both sides and bottom of said frame and against the closing edge of said window.

3. The assembly with, weather stripping referred to in (1) above where on the front surface of said enclosure are embossed knockouts of suitable sizes and shapes to accept various panel connections such as telephone modular recepticles and audio video connectors said knockouts embossed in the material of said front surface of said enclosure to the extent that, said material is deformed but not ruptured and to the extent that said knockout may be with reasonable pressure punched entirely through said material of said front surface leaving a mounting hole for said recepticles and connectors and where said enclosure has an opening in its rear surface to provide access to said knockouts.

4. The assembly referred to in 1 above wherein are placed a set of mounting holes through the rear surface of said enclosure near each longer edge closer to the open end of said enclosure, symmetrical about the horizontal axis of said enclosure and having mounted to whichever set of mounting holes is towards said closing windows in application by suitable removable mechanical means a flat oblong bracket of rigid material having mounting holes coincident with said set of mounting holes in said rear surface of said enclosure, and so oriented on said bracket that said bracket extends beyond the edge of said enclosure the extent that the mounting surface of said bracket would overlap the inner surface of a window closed on said assembly.

5. The assembly referred to in (4) above where said removable bracket mounting means extends through said surface of said enclosure and is significant to penetrate the surface of said inner panel adjacent to said surface of said enclosure, thereby mechanically fixing the orientation of said inner panel in extension out of said enclosure.

6. The assembly referred to in (1) above whereon affixed to the front surface by suitable mechanical means are clamping means for cables to be connected to said assemblies recepticles.

* * * * *